United States Patent [19]

Tatelbame

[11] Patent Number: 4,912,855
[45] Date of Patent: Apr. 3, 1990

[54] INSTRUMENT AND CASE

[76] Inventor: Herbert A. Tatelbame, 6724 N. Kimball Ave., Lincolnwood, Ill. 60645

[21] Appl. No.: 277,771

[22] Filed: Nov. 30, 1988

[51] Int. Cl.⁴ .............................................. G01B 3/16
[52] U.S. Cl. ............................... 33/558.01; 206/224; 206/371
[58] Field of Search .................. 33/558.01–558.09, 33/558.1–558.5; 206/224, 371, 349, 592, 587, 588

[56] References Cited

U.S. PATENT DOCUMENTS

| | | | |
|---|---|---|---|
| 791,864 | 6/1905 | Bell | 206/371 X |
| 2,332,861 | 10/1943 | Langsner | 206/371 X |
| 2,945,584 | 7/1960 | Vaughan | 206/224 |

*Primary Examiner*—Harry N. Haroian
*Attorney, Agent, or Firm*—John C. Shepard

[57] ABSTRACT

A drafting or measuring instrument, such as a caliper, divider or compass, has legs pivotally connected at one end and carries working elements at the opposite ends which may be moved between closed and opened positions. A thin case for releasably holding the instrument has an opening with an inner side wall conforming generally to the outer edge of the instrument so that the instrument may be placed in the opening. Formed on the respective opening side wall and the instrument edge are cooperating projections and grooves. The instrument may be manually positioned in the opening with the attaching projections being engaged by the retaining grooves so that the instrument is releasably held in the case until relative pressure is exerted between the instrument and the case to remove the instrument. An aperture may be defined at one end of the opening to receive the working elements of the instrument.

16 Claims, 2 Drawing Sheets

INSTRUMENT AND CASE

BACKGROUND OF THE INVENTION

1. Technical Field

This invention relates generally to drafting or measuring instruments and, more particularly, to an instrument and a case made in combination.

2. Background Art

The use of calipers, dividers, compasses and the like to take measurements, set off distances, or draw circles and arcs is well known. Typically, these instruments have sharp points or delicate writing elements attached to their working ends. Consequently, it is highly desirable to place these instruments in a carrying case to avoid damage to the instrument itself and prevent injury to the user.

In the past, slip cases or padded boxes have been employed to store and transport this type of instrument. When a slip case was employed, the instrument would often puncture the case or fall from the case. In addition, because of the inconvenience of placing the instrument in the case or carrying a box, the user often avoided employing the protective case when the instrument was not in use. As a result, the instrument was often damaged or the user was injured when the instrument was not placed in its case when not in use.

SUMMARY OF THE INVENTION

The present invention is directed to overcoming one or more of the problems as set forth above.

The present invention relates to a drafting or measuring instrument and a relatively thin case for carrying the instrument. The case has an opening conforming to the general shape of the instrument so that the instrument may be placed in the opening. The instrument and case are provided with cooperating attaching and retention means such that the attaching means may be embraced by the retention means when the instrument is positioned in the case opening to releasably hold the instrument therein. The instrument may be selectively removed from the case by manually exerting relative pressure between the instrument and case such that the case is cammed slightly outward away from the instrument thereby disengaging the attaching and retention means.

In one embodiment of the invention, longitudinal projections extend inwardly from the longitudinal side walls defining the case opening and grooves are formed in the longitudinal lateral edges of the instrument. The projections are engageable within the grooves, which extend at least over the longitudinal extent of the projections so that all of the projections reside completely within the grooves.

In an alternative embodiment of the invention, outwardly extending flanges are provided on the lateral outer edges of the instrument and grooves are formed in the side walls of the opening to engage the edge flanges of the instrument.

In a preferred embodiment of the invention, an aperture is defined at one end of the case opening and is adapted to receive an end of the instrument, which would preferably be the end of the instrument carrying the working elements, namely, the points or writing tips. The enclosing aperture provides protection against damage to the working elements and injury to the user.

The protective aperture may extend to the edge of the card to facilitate molding of the case.

The instrument and case have substantially the same relative thickness and either may be conveniently molded from plastic material.

BRIEF DESCRIPTION OF THE DRAWINGS

The details of construction and operation of the invention are more fully described with reference to the accompanying drawings which form a part hereof and in which like reference numerals refer to like parts throughout.

In the drawings.

DESCRIPTION OF THE PREFERRED EMBODIMENTS

Figure 1:
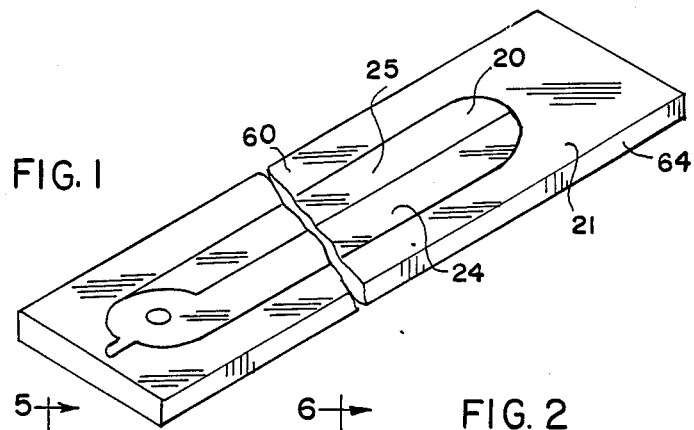
FIG. 1 is a broken, perspective view of an instrument and case constructed in accordance with the present invention.

Best Modes for Carrying Out the Invention

Referring to FIGS. 1 through 3 and 5 through 8, an instrument, generally designated 20, is shown carried by a relatively thin case, generally designated 21. Although it is contemplated that the instrument 20 and the case 21 may be made of any number of materials, they are most advantageously molded from plastic.

The instrument 20 may be a drafting or measuring implement such as a divider 23, or a caliper or compass (not shown). The divider 23 is used to conveniently transfer measurements from one medium to another or to set off distances. The instrument 20 includes a pair of elongate legs 24 and 25 pivotally fixed together at their respective rearward ends 27 and 28 by a pin 30 which extends between the enlarged, overlapping arcuate leg portions 32 and 33. On the proximal end of the instrument 20 is a finger post 35.

The separable distal tip ends 37 and 38 carry respective working elements, 40 and 41, either of which may be a metal point, needle, writing tip or similar part. It is understood that the working elements 40 and 41 may be embedded into the ends 37 and 38 or formed integrally therewith. Because of the pivot 30, the instrument 20 may be moved between a closed position with the working elements 40 and 41 adjacent to each other as seen in FIG. 7 and an open position with the working elements 40 and 41 in spaced relation as seen in FIG. 8 by manually rotating the legs 24 and 25 relative to one another.

Figure 7:
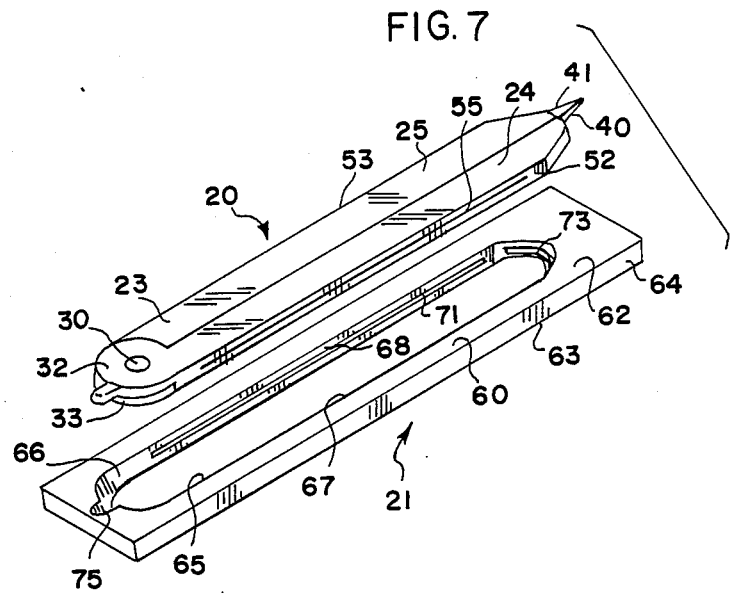
FIG. 7 is an exploded, perspective view of the embodiment shown in FIG. 1 showing the closed instrument removed from the case; and, FIG. 8 is a top elevational view of the instrument removed from the case and in open position.
Figure 8:
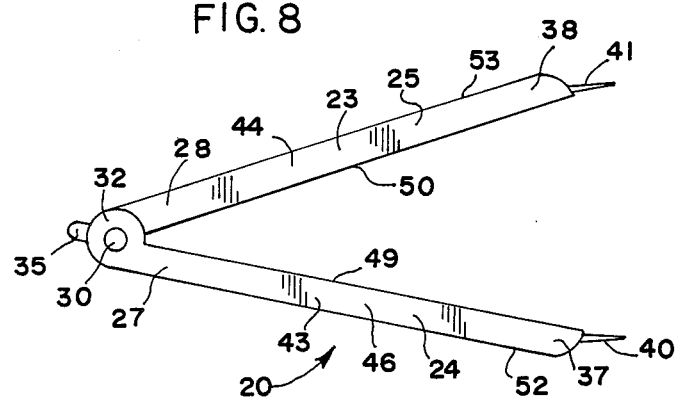

When the instrument 20 is closed as seen in FIG. 7, the main body portions 43 and 44 of the adjacently disposed legs 24 and 25 of the instrument 20 have generally parallel longitudinal axes. As oriented in the drawings, the instrument legs 24 and 25 are each defined by relatively flat upper and lower surfaces 46 and 47, inner side edges 49 and 50, and outer side edges 52 and 53. Defined in each of the outer side edges 52 and 53 are outwardly opening recesses, or grooves 55 and 56, respectively, extending longitudinally at least over a lateral segment thereof. In the embodiment shown, the retaining grooves 55 and 56 have a semi-circular cross-sectional configuration.

The carrying case 21 is a relatively thin, rectangular card 60 having a substantially flat upper surface 62 and a substantially flat lower surface 63 with a peripheral edge 64 extending around the perimeter of the card 60. The peripheral edge 64 defines the thickness of the case 21, which in the preferred embodiment is the same as the thickness of the instrument 20 so that the instrument and case can be conveniently carried by a user or in his pocket.

As best seen in FIG. 7, an elongate opening 65 is defined through the upper surface 62 of the case 21. A side wall 66 circumscribing the opening 65 conforms generally to the shape of the closed instrument 20. The side wall 66 has lateral portions 67 and 68 which will flank the lateral outer edges 52 and 53 of the legs 24 and 25 when the instrument 20 is positioned in the case 21. In the preferred embodiment as shown, the opening 65 extends through the entire thickness of the case 21 between its upper and lower surfaces 62 and 63 as best seen in FIG. 7.

Protruding opposed longitudinal flanges, or projections 70 and 71, are formed on the opening side walls 67 and 68, respectively, and extend laterally inward into the opening 65. In the embodiment shown, the attaching projections 70 and 71 have a semi-circular cross section of a configuration and size substantially corresponding to the configuration and size of the grooves 55 and 56 such that the projections 70 and 71 are adapted to engage and embrace the grooves 55 and 56, respectively. The projections 70 and 71 extend along a segment of the side walls 67 and 68 corresponding to the length of the grooves 55 and 56. In an alternative embodiment, the cooperating projections and recesses might extend the entire length of the instrument 20 or comprise a longitudinal series of cooperating projections and grooves.

Figure 2:
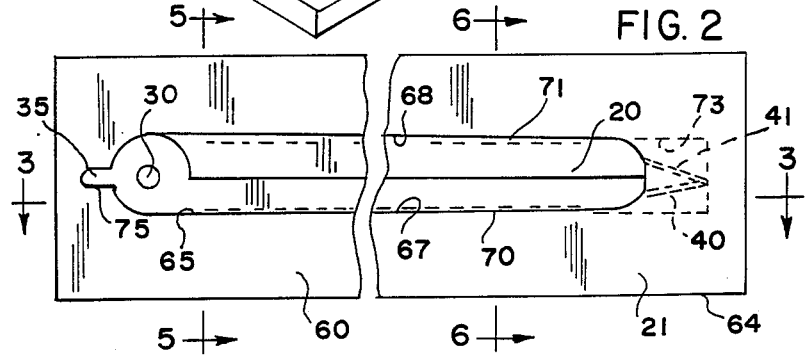
FIG. 2 is a broken, top elevational view of the instrument and case shown in FIG. 1.
Figure 3:
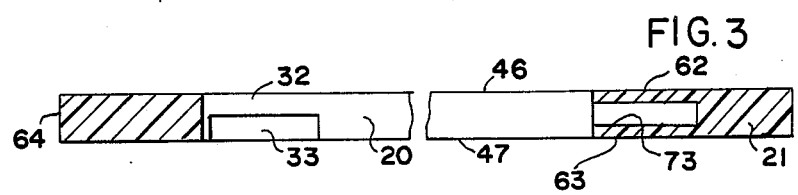
FIG. 3 is an enlarged, broken, cross-sectional view taken along line 3—3 of FIG. 2.

At the distal end of the case opening 65, an aperture 73 is defined which is adapted to receive the instrument's working elements 40 and 41 as seen in FIGS. 2 and 7. The aperture 73 extends from the distal end of the opening 65 between the upper and lower surfaces 62 and 63 of the card 60 longitudinally toward the distal edge of the card. A cutout 75 is defined at the proximal end of the opening 65 and is adapted to receive the finger post 35 of the instrument 20 therein.

To insert the instrument 20 in the case 21, the instrument 20 is loaded from above by inserting the working elements 40 and 41 into the aperture 73 and then moving the proximal end of the instrument 20, i.e., the end with the finger post 35, downward into the opening 65. By so doing, the instrument legs 24 and 25 engage the projections 55 and 56 on the side walls 67 and 68 of the case opening 65. Further relative pressure forces the instrument 20 into the opening 65 with the legs 24 and 25 pushing against the projections 70 and 71 to cam the side walls 67 and 68 slightly outwardly from the open space to permit the instrument 21 to be located in the opening 65. When the grooves 55 and 56 of the legs 24 and 25 are laterally aligned with the case projections 70 and 71, the side walls 67 and 68 will flex back moving the projections 70 and 71 into the grooves 55 and 56. As a result, the instrument 20 is held within the case opening 65. When the instrument 20 is thusly "snapped" into the case 21, the protruding working elements 40 and 41 are concealed, thereby protecting the working elements 40 and 41 from damage and preventing possible injury to the instrument's user.

To remove the instrument 20 from the case 21, the user holds the case 21 and applies manual pressure to the bottom 47 of the instrument 20 to urge the instrument 20 upwardly from the case opening 65. Relative pressure causes the case 21 to be cammed outward so that the instrument 20 can be moved past the camming tabs 70 and 71 and away from the case 21.

Figure 4:
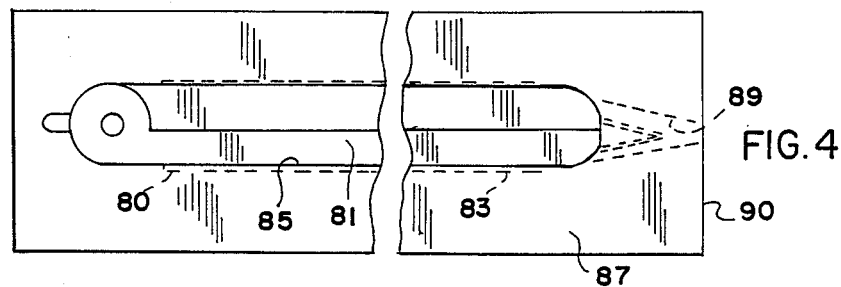
FIG. 4 is a broken, top elevational view of a second embodiment of an instrument and case constructed in accordance with the present invention.
Figure 5:
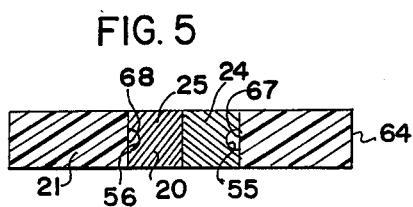
FIG. 5 is an enlarged, cross-sectional view of the instrument and case taken along line 5—5 of FIG. 2.
Figure 6:
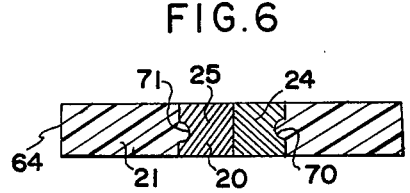
FIG. 6 is an enlarged, cross-sectional view of the instrument and case taken along line 6—6 of FIG. 2.

In FIG. 4, an alternative embodiment of the instrument and case combination is shown. Herein, longitudinal attaching tabs 80 are carried by the edge of the instrument 81 and longitudinal retaining grooves 83 are defined in the side wall of the elongate opening 85 formed in the case 87. Further, the working element aperture 89 is configured to more closely approximate the actual configuration of the closed instrument working ends. To provide for inside action during manufacturing by molding with plastic, the enclosing aperture 89 may be extended to the outer edge 90 of the distal end of the case 87.

In an alternative embodiment not shown, each of the instrument legs may be pivotally attached to an end piece with the end piece and the proximal end of the case opening carrying a cooperating projection and groove. In such a configuration, one end of the instrument is held in the case by the working elements within the distal aperture and the other end is held in the case by the cooperating projection and groove. As a result, the lateral projections and grooves may be eliminated.

Industrial Applicability

From the foregoing, it should be apparent that the present invention provides a novel and convenient method for safely carrying a pointed instrument. Information necessary for operating the instrument or interpreting measurements taken by the instrument may be provided on the case surface either by printing directly on the case, by applying a decal, or by other suitable means. By so doing, it is not necessary to carry both a separate slip case for the instrument and supplemental reference materials when the user employs the instrument.

Other aspects, objects and advantages of this invention can be obtained from a study of the drawings, the disclosure and the appended claims.

What is claimed is:

1. The combination of an instrument and case comprising:
an instrument having legs pivotally connected at one end with the opposite ends of said legs being selectively movable between a closed position adjacent each other and an open position spaced from each other;
a relatively flat case having an upper surface defining an opening with a side wall conforming generally to the shape of the instrument such that the instrument may be placed therein, at least a portion of said opening extending through the entire thickness of the case between its upper and lower surfaces;
one of the instrument and said side wall having protruding attaching means extending therefrom; and, the other of the instrument and said side wall having retention means for engaging said attaching means, whereby the instrument may be forcefully positioned in the case opening by manual action so that said attaching means embraces said retention means to releasably hold the instrument in the case and may be removed from the case opening by manual action against an exposed part of the instrument.

2. The combination of claim 1 wherein each of said instrument legs has a lateral outer edge, said side wall has lateral portions flanking said lateral outer edges, one of said outer edges and said side wall portions has said attaching means extending therefrom, and the other of said outer edges of said side wall portions has said retention means for engaging said attaching means.

3. The combination of claim 2 wherein said side wall portions define inwardly directed attaching means extending toward one another and said legs define outwardly directed retention means for embracing said attaching means.

4. The combination of claim 3 wherein said side attaching means includes projections extending from said side wall portions laterally inward into said opening and said retention means includes outwardly facing grooves on said legs adapted to receive said projections.

5. The combination of claim 2 wherein said legs define outwardly directed attaching means and said side wall portions define inwardly directed retention means for embracing said attaching means.

6. The combination of claim 1 wherein each of said instrument legs has a lateral outer edge, each leg edge is located adjacent to a corresponding side wall when the instrument is positioned in said opening, one of each pair of corresponding leg edge and opening side wall has a flange extending laterally therefrom, and the other of each pair of corresponding leg edge and opening side wall has a laterally opening slot for engaging its respective flange and releasably holding the instrument in the case.

7. The combination of claim 1 wherein said opening extending through the entire thickness of the case between its upper and lower surfaces has generally the same size and shape at both surfaces.

8. The combination of claim 1 wherein the instrument and the case have substantially the same relative thickness.

9. The combination of claim 8 wherein the instrument and the case are each formed from plastic material.

10. The combination of an instrument and case comprising:
an instrument having legs pivotally connected at one end with the opposite ends of said legs being selectively movable between a closed position adjacent each other and an open position spaced from each other;
a relatively flat case having an upper surface defining an opening with a side wall conforming generally to the shape of the instrument such that the instrument may be placed therein and further including an aperture defined at one end of said opening adapted to receive an end of said instrument;
one of the instrument and said side wall having protruding attaching means extending therefrom; and,
the other of the instrument and said side wall having retention means for engaging said attaching means, whereby the instrument may be forcefully positioned in the case opening by manual action so that said attaching means embraces said retention means to releasably hold the instrument in the case.

11. The combination of claim 10 wherein said opposite ends of said instrument legs carry working elements and said aperture is adapted to receive said working elements.

12. The combination of claim 10 wherein said aperture extends from said opening to the outer edge of the case.

13. The combination of a drafting or measuring instrument and a card for carrying the instrument comprising:
an instrument having a pair of legs pivotally connected such that said legs may be relatively rotated between a closed position with said legs adjacent one another and an open position with said legs spaced from one another;
a card defining an opening having lateral side walls conforming generally to the lateral edges of the instrument so that the instrument may be positioned therein, at least a portion of said opening extending through the entire thickness of the card between the upper and lower surfaces thereof;
one of said instrument edges and said card side walls having protruding attaching means extending therefrom; and,
the other of said instrument edges and said card side walls having recessed retention means for embracing said attaching means, whereby the instrument may be manually positioned in the card opening with the lateral edges of the instrument aligned with the side walls of said opening so that said attaching means engages said retention means to hold the instrument in the card and the instrument may be removed from the card opening by manual pressure applied against an exposed instrument part.

14. The combination of claim 13 wherein said opening side walls having projections extending inwardly into said opening and said instrument edges have outwardly opening slots adapted to embrace said projections when the instrument is positioned in said opening.

15. The combination of claim 13 wherein said instrument edges have outwardly extending projections and said opening side walls have inwardly opening slots adapted to embrace said projections when the instrument is positioned in said opening.

16. The combination of an instrument and case comprising:
an instrument having elongate legs pivotally connected at one end and carrying working elements at the opposite ends selectively movable between a closed position adjacent one another and an open position spaced from one another, each of said legs having a lateral outer edge;
a flat case of the same relative thickness as the instrument and having an upper surface and a lower surface, the case defining an opening extending between said upper and lower surfaces with lateral inner side walls conforming generally to the outer edges of the closed instrument and an aperture at one longitudinal end of said opening adapted to receive said working elements on the ends of said legs so that the instrument may be placed in said opening with its outer edges adjacent a corresponding inner side wall of said opening and said working elements in said aperture;

one of each pair of corresponding leg edge and side wall having a longitudinal projection extending laterally therefrom; and, the other of each pair of corresponding leg edge and side wall having a longitudinal lateral groove for embracing its respective projection, whereby the instrument may be forcefully positioned within said case opening by manual action until said projections are located within and engage said grooves to releasably hold the instrument in the case.

* * * * *